US011177946B2

United States Patent
Islam et al.

(10) Patent No.: US 11,177,946 B2
(45) Date of Patent: Nov. 16, 2021

(54) QUANTUM ENTROPY DISTRIBUTED VIA SOFTWARE DEFINED PERIMETER CONNECTIONS

(71) Applicant: Verizon Patent and Licensing Inc., Arlington, VA (US)

(72) Inventors: Junaid Islam, San Jose, CA (US); William F. Copeland, Garland, TX (US); Mohammed M. Rahman, Allen, TX (US); Gina L. Otts, Flower Mound, TX (US); Brent R. Bilger, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 195 days.

(21) Appl. No.: 16/448,882

(22) Filed: Jun. 21, 2019

(65) Prior Publication Data

US 2020/0403787 A1    Dec. 24, 2020

(51) Int. Cl.
| | |
|---|---|
| *H04L 9/08* | (2006.01) |
| *G06F 7/58* | (2006.01) |
| *H04L 9/32* | (2006.01) |
| *H04L 9/00* | (2006.01) |
| *H04L 9/06* | (2006.01) |

(52) U.S. Cl.
CPC ............ *H04L 9/0852* (2013.01); *G06F 7/588* (2013.01); *H04L 9/0827* (2013.01); *H04L 9/3215* (2013.01); *H04L 9/3263* (2013.01)

(58) Field of Classification Search
CPC ... H04L 9/0852; H04L 9/3125; H04L 9/3263; H04L 9/0827; H04L 9/006; H04L 9/0662; H04L 9/3215; G06F 7/588
See application file for complete search history.

(56) References Cited

U.S. PATENT DOCUMENTS

| | | | |
|---|---|---|---|
| 9,830,467 B1* | 11/2017 | Harold | H04L 9/0852 |
| 10,140,095 B2* | 11/2018 | Dale | G06F 7/58 |
| 10,402,172 B1* | 9/2019 | Mandich | G06F 7/588 |
| 10,855,457 B1* | 12/2020 | Vakili | H04L 9/0869 |
| 2011/0064222 A1* | 3/2011 | Wiseman | H04L 9/0827 380/255 |
| 2014/0244785 A1* | 8/2014 | Potlapally | H04L 9/0869 709/217 |
| 2016/0226846 A1* | 8/2016 | Fu | H04L 63/062 |
| 2017/0331623 A1* | 11/2017 | Fu | G06F 21/602 |
| 2018/0287788 A1* | 10/2018 | Pital a Garcia | H04L 9/0858 |
| 2019/0229900 A1* | 7/2019 | Khristi | H04L 67/02 |

* cited by examiner

*Primary Examiner* — Vu V Tran

(57) ABSTRACT

A computer device may include a memory storing instructions and processor configured to execute the instructions to receive a request for quantum random numbers from a client device. The processor may be further configured to establish a secure communication channel with the client device; obtain a stream of quantum random numbers from a quantum random number generator appliance; and provide a set of quantum random numbers from the obtained stream of quantum random numbers to the client device via the established secure communication channel.

20 Claims, 8 Drawing Sheets

QUANTUM ENTROPY DISTRIBUTED VIA SOFTWARE DEFINED PERIMETER CONNECTIONS

BACKGROUND INFORMATION

Computer devices used by entities such as government agencies, financial institutions (e.g., banks or trading houses), or large corporate enterprises, send and receive sensitive information that requires a high degree of security. In order to securely transfer information, the computer systems may use encryption to protect sensitive information and/or may require authentication or authorization a particular user or device. Efficient and reliable encryption, authentication, and/or authorization may pose various challenges.

DETAILED DESCRIPTION OF PREFERRED EMBODIMENTS

Figure 1:
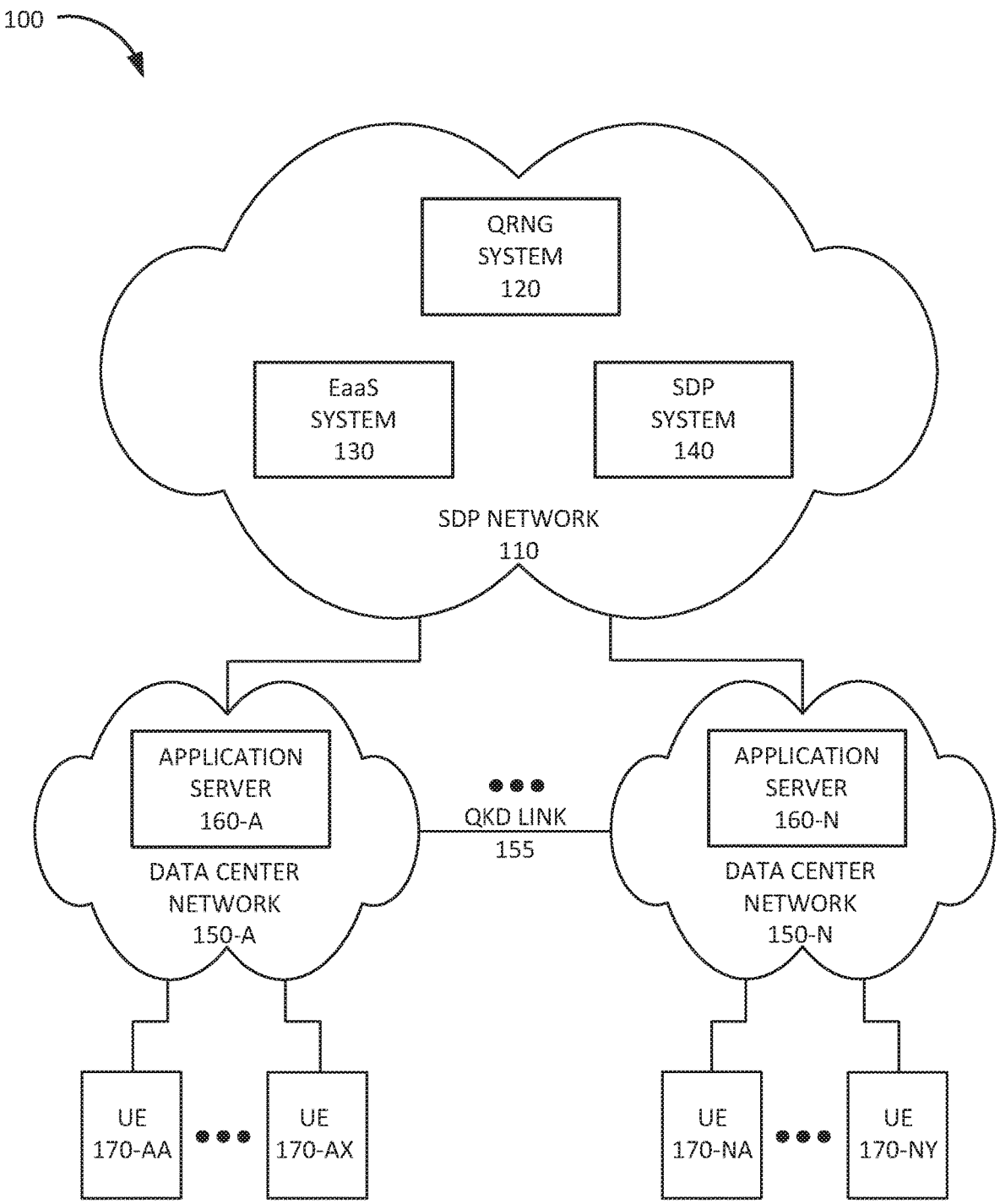
FIG. 1 is a diagram illustrating an environment according to an implementation described herein.

The following detailed description refers to the accompanying drawings. The same reference numbers in different drawings identify the same or similar elements.

Security protocols used for encryption or for digital signatures, such as a Public Key Infrastructure (PKI) system, use digital certificates for authenticating users or devices. A PM system manages the creation, storage, and distribution of digital certificates and uses the digital certificates to verify ownership of public keys. Generation of digital certificates and/or session keys may require random numbers in order to prevent an unauthorized party from predicting a certificate or key value.

The quality of random numbers varies based on the techniques used to produce them. High quality random numbers are less predictable and are said to have high entropy. For example, random numbers may be generated using software techniques known as cryptographic pseudo-random number generation, in which a seed value is used to initialize a computationally complex mathematical function that generates pseudorandom values. However, pseudorandom number generation is not appropriate for high security applications because such methods generate relatively low entropy random numbers that are vulnerable to cryptoanalytic attacks.

Random numbers with higher entropy may be generated using a hardware random number generator (HRNG). A HRNG generates random numbers using a physical process, rather than an algorithm. The physical processes may include environmental conditions measured by a sensor associated with a computer device, such as, for example, thermal noise measured by a temperature sensor, ambient audio signals picked up by a microphone, variations in ambient light captured by an optical camera, variation in infrared signals measured by a proximity sensor, and/or another type of environmental parameter measured by a sensor.

User devices, such as smart phones, may include one or more such sensors that may be used to sample the environment to generate high entropy random numbers. However, generation of certificates or keys may often need to be performed by server devices that are "headless," meaning that they do not include any input or output devices, or environmental sensors. Furthermore, while a user device may need to handle a small number of sessions at a time, and therefore use a small number of sessions keys, a server device may be handling a large number of connections that quickly exhaust any sources of entropy available to such a server device. Therefore, server devices may often be starved for entropy.

A quantum random number generator (QRNG) may generate quantum random numbers using quantum phenomena that cannot be predicted because they are fundamentally random. Examples of such quantum phenomena include measurements of photons traveling through a semi-transparent mirror, nuclear decay from a radiation source measured by a Geiger counter, shot noise in an electronic circuit measured by a photodiode or an electron tube, amplification of tunneling electrons through the band gap of a semiconductor, homodyne detection of fluctuations in vacuum energy, and/or other types of quantum phenomena. However, a QRNG may be expensive and not available to particular computer devices that are in need of high entropy random numbers.

A Software Defined Perimeter (SDP) system may protect a network of computer devices by combining device authentication, access based on verified identity, and connections that are provisioned dynamically as needed. An SDP system may include an SDP controller that functions as, or interfaces with, a certificate authority and authenticator. Client devices seeking to access devices in the SDP may include an SDP client that has to interface with an SDP gateway on a particular device in the SDP in order to communicate with the particular device. The SDP controller may manage all connections between SDP clients and SDP gateways. For example, each connection between an SDP client and an SDP gateway may be established via a secure connection, such as a Transport Layer Security (TLS) connection established using certificates generated by the SDP controller. In some implementations, SDP connections may be established using Single Packet Authorization (SPA), in which a single packet is used to transmit authorization data. After the SPA packet is verified, the TLS handshake to establish the TLS connection may be initiated.

Devices in an SDP may be protected from scanning attacks, as no Domain Name Server (DNS) or port information may be available to devices outside the SDP. Furthermore, each device seeking access to another device in the SDP may need to verify its identity using a Multi-Factor Authentication (MFA) token during the establishment of the secure connection. Furthermore, permission for an SDP client to access a particular SDP gateway may only be granted if the SDP client is authorized to access a particular service available at the particular SDP gateway. Such permissions may be managed by the SDP controller via, for example, Security Assertion Markup Language (SAML) authorizations. Moreover, the SDP controller may only grant application level access to the SDP client for whitelisted applications.

Implementations described herein relate to quantum entropy distributed via software defined perimeter connections. A computer device may be configured to provide Entropy-as-a-Service (EaaS) by providing quantum random numbers from a QRNG via a secure SDP connection to a client device requesting quantum random numbers. For example, the computer device may be configured to receive a request for quantum random numbers from a client device, establish a secure communication channel with the client device, obtain a stream of quantum random numbers from a QRNG, and provide a set of quantum random numbers from the obtained stream of quantum random numbers to the client device via the established secure communication channel. The secure communication channel may include an SDP control channel. A "quantum random number," as the phrase is used herein, refers to a particular number of quantum bits generated by a QRNG based on detecting a particular quantum phenomenon.

In some implementations, the stream of quantum random numbers may be obtained from a real time stream of quantum random numbers generated by a QRNG. In other implementations, a stream of quantum random numbers obtained from the QRNG may be stored in a data store and later retrieved in response to a request for quantum random numbers. The computer device may determine a quantity of quantum random numbers requested by the client device and provide the determined quantity of quantum random numbers to the client device via the established secure communication channel. Furthermore, the quantum random numbers may be removed (e.g., deleted) from the data store after they are provided to a client device to ensure that no quantum random number is used more than once. Thus, each quantum random number may correspond to a cryptographic nonce.

A computer device, such as an SDP controller, an application server, and/or another device in the SDP, may receive a set of quantum random numbers from the EaaS device and use one or more of the quantum random numbers from the received set to generate a digital certificate. As an example, the computer device may generate a public key certificate using the stream of quantum numbers. The public key certificate may be used to generate a secure communication tunnel to another device. As another example, the computer device may use the quantum random numbers to generate session keys during a TLS handshake at the beginning of a TLS session. The session keys may be generated using a client random sequence, a server random sequence, and/or a premaster secret sequence generated using the quantum random numbers. The session keys may then be used for symmetric encryption of data exchanged between the client and server via the TLS session.

Using an SDP protocol to distribute quantum random numbers may enable quantum random numbers to be distributed in a secure way that is immune to particular types of security attacks. For example, in one type of security attack, an adversary may make multiple TLS handshake connections to a server device to learn about the randomness capabilities of the server device. Because each TLS handshake requires generation of random sequences, the server device may exhaust its supply of entropy and the adversary may then be able to predict the next session key. However, an SDP connection may be established using SPA, which is a shared secret algorithm, rather than an algorithm based on public/private keys, and therefore does not require the sharing of random numbers. In the establishment of an SDP connection, since a TLS handshake may only occur after the SPA is completed, entropy exhaustion via multiple TLS handshakes may be prevented.

In some implementations, the computer device may, upon receiving the quantum random numbers, combine the received quantum random numbers with a local source of random numbers. For example, the computer device may hash a received stream of quantum random numbers with a local source of random numbers to generate a random number stream.

In some implementations, a computer device may be configured to distribute quantum random numbers by encrypting one or more quantum random numbers, from a stream of quantum random numbers, into a public key and providing the public key to a client device that has requested quantum random numbers. Furthermore, in some implementations, quantum random numbers may be distributed via a quantum key distribution (QKD) link. A QKD link may be implemented by sending photons via an optical fiber (or through free space) and using a cryptographic protocol that enables the two parties communicating via the QKD link to prevent eavesdropping by either using quantum indeterminacy to prevent measurement of a particular quantum state or by exchange photons in an entangled state. Because measuring one photon of an entangled pair of photons affects the other photon in the pair, anyone intercepting either photon alters the entangled pair and reveals that the communication has been compromised. Thus, a QKD link may be used to securely distribute quantum random numbers.

FIG. 1 is a diagram of an exemplary environment 100 in which the systems and/or methods, described herein, may be implemented. As shown in FIG. 1, environment 100 may include an SDP network 110, data center networks 150-A to 150-N (referred to herein collectively as "data center networks 150" and individually as "data center network 150"), a QKD link 155, and UE devices 110-AA to 110-NY (referred to herein collectively as "UE devices 110" and individually as "UE device 110").

SDP network 110 may include a packet data network that includes an SDP. The packet data network may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. SDP network 110 may include a QRNG system 120, an EaaS system 130, and an SDP system 140.

QRNG system 120 may include a set of QRNG appliances. Each QRNG appliance may generate a stream of quantum random numbers based on quantum phenomena. For example, each QRNG appliance may include a set of detectors that measure a particular quantum phenomenon, such as photons traveling through a semi-transparent mirror, nuclear decay from a radiation source measured by a Geiger counter, shot noise in an electronic circuit measured by a photodiode or an electron tube, amplification of tunneling electrons through the band gap of a semiconductor, homodyne detection of fluctuations in vacuum energy, and/or other types of quantum phenomena. The QRNG appliance may generate a real time stream of quantum bits at a particular rate (e.g., 4 Megabits per second (Mbits/sec), 8 Mbits/sec, 16 Mbits/sec, etc.) based on the number of included detectors and provide the real time stream of quantum bits to EaaS system 130.

EaaS system 130 may include one or more devices, such as computer devices and/or server devices, which provide EaaS to client devices by providing a set of quantum random numbers obtained from QRNG system 120 via a secure connection. EaaS system 130 may convert a stream of quantum bits into a stream of random quantum numbers based on the number of bits in values used to generate digital certificates or based on the number of bits specified in a request for quantum random numbers. EaaS system 130 may receive a real time stream of quantum bits from QRNG system 120 and may either provide a real time stream of quantum random numbers to a client device or may store the quantum bits in a data store as quantum random numbers to be provided to a client device at a later time. EaaS system 130 may establish a secure SDP connection to the client device via SDP system 140 and may provide quantum random numbers to the client device via the established secure SDP connection.

SDP system 140 may include one or more devices, such as computer devices and/or server devices, which maintain an SDP in SDP network 110 and/or data center networks 150. SDP system 140 may include an SDP controller that performs device authentication, access authorization, and/or provisioning of connections in SDP network 110. For example, SDP system 140 may generate certificates for connections from an SDP client to an SDP gateway, associated with a device in SDP network 110, or from an SDP client attempting to communicate with devices in the SDP network 110. Thus, SDP system 140 may manage all connections in SDP network 110 by authorizing each connection and establishing a secure connection using TLS or another secure communication method. SDP system 140 may establish secure connections using certificates generated using quantum random numbers obtained from EaaS system 130. All communication sessions managed by SDP system 140 may be encrypted.

Data center network 150 may include a Layer 2 and/or Layer 3 network that includes one or more computer devices, such as application server 160. Application server 160 may provide cloud computing services for UE devices 110 or host an application used by UE devices 110. The cloud computing services may include, for example, computing as a service, cloud storage, a hosted Voice over Internet Protocol (VoIP) service, a Network Address Translation (NAT) service, a Virtual Private Network (VPN) service, a security service (e.g., Distributed Denial of Service (DDOS) detection and/or mitigation, Intrusion Detection and Prevention (IDP), virus, spyware, and/or malware detection, etc.), an email filtering service, a load balancing service, a video hosting and/or distribution service, a lawful intercept service on behalf of a law enforcement agency, and/or any other type of service that may be provided by a cloud computing data center. As another example, application server 160 may host a web site that may be accessed by UE device 110. As yet another example, application server 160 may be associated with a particular enterprise in a private network accessible by UE devices 110 associated with the particular enterprise. As yet another example, application server 160 may host one or more virtual network functions (VNFs) for a wireless access or core network managed by a provider of communication services. Application server 160 may request quantum random numbers from EaaS system 130.

QKD link 155 may connect two data centers 150 using an optical fiber communications link that includes a QKD capability. While QKD link 155 is shown between data center network 150-A and data center network 150-N for illustrative purposes, in practice, any two data centers 150 may be connected via QKD link 155. Furthermore, any connection between QRNG 120, EaaS system 130, SDP system 140, and/or application server 160 may include QKD link 155. QKD link 155 may be used to distribute quantum random numbers between different data center networks 150 in a cryptographically secure manner. For example, if application server 160-N in data center network 160-N is unable to connect to SDP network 110 and unable to obtain quantum random numbers directly via an SDP connection, application server 160-N may request and obtain quantum random numbers from application server 160-A via QKD link 155. In addition, QKD link 155 may facilitate data center redundancy, failover and backup capabilities. For example, data center network 150-N may act as a backup to all or a portion of the components of data center network 150-A, and may use QKD link 155 to exchange data securely, including credentials provided from SDP Network 110.

UE device 110 may include any computer device capable of communicating with application server 160 via a wired, optical, and/or wireless connection (e.g., using a cellular network via a base station (not shown in FIG. 1), a WiFi access point (not shown in FIG. 1), etc.). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
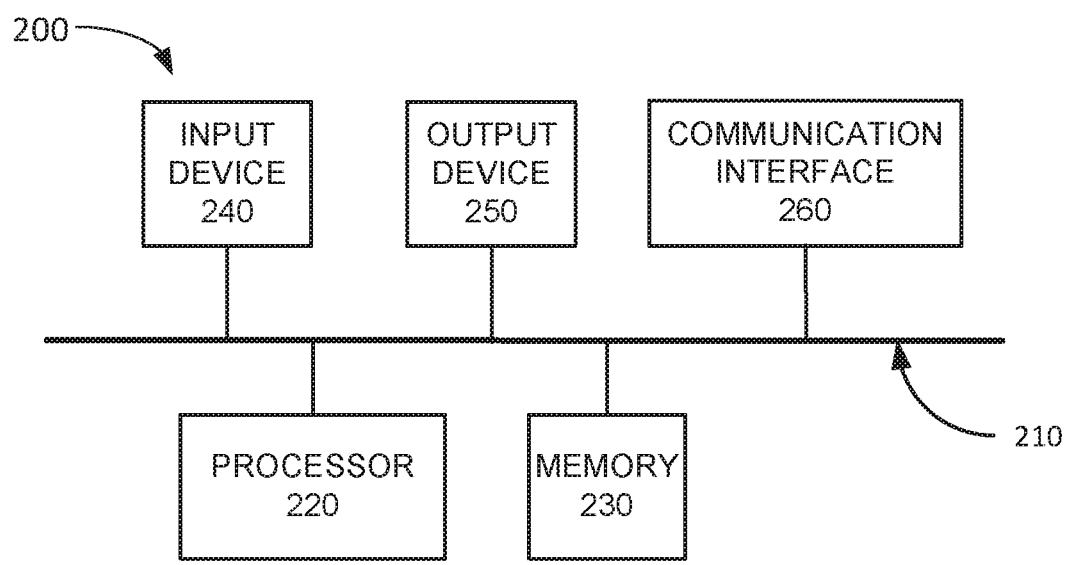
FIG. 2 is a diagram illustrating exemplary components of a device that may be included in a component of FIG. 1 according to an implementation described herein.

FIG. 2 illustrates example components of a device 200 according to an implementation described herein. QRNG system 120, EaaS system 130, SDP system 140, application server 160, and/or UE device 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to distribution of quantum random numbers via SDP connections. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
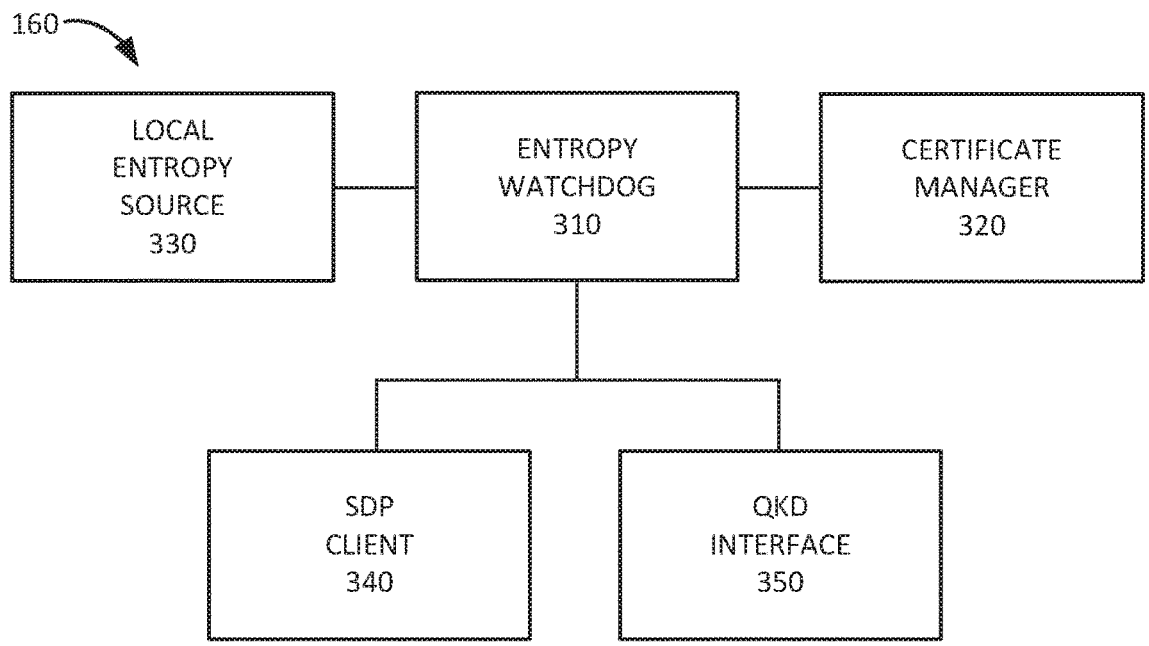
FIG. 3 is a diagram illustrating exemplary components of the application server of FIG. 1 according to an implementation described herein.

FIG. 3 is a diagram illustrating exemplary components of application server 160. The components of application server 160 may be implemented, for example, via processor 220 executing instructions from memory 230. Alternatively, some or all of the components of application server 160 may be implemented via hard-wired circuitry. As shown in FIG. 3, application server 160 may include an entropy watchdog 310, a certificate manager 320, a local entropy source 330, an SDP client 340, and a QKD interface 350.

Entropy watchdog 310 may monitor the availability of random numbers and/or may monitor the quality (e.g., the entropy or randomness) of available random numbers in application server 160. As an example, entropy watchdog 310 may determine the bit rate of a stream of locally generated random numbers, and/or a bit rate of a stream of random numbers that is a hashed combination of locally generated random numbers and quantum random numbers obtained from EaaS system 130, is below a required bit rate for processes in application server 160 that utilize random numbers. As another example, entropy watchdog 310 may measure the randomness of the locally generated random numbers and/or of the hashed combinations of locally generated random numbers and quantum random numbers obtained from EaaS system 130. Entropy watchdog 310 may then determine whether the measured randomness is below a quality threshold. The randomness of a sequence of random numbers may be measured, for example, using the Diehard Battery of Tests, the TestU01 library of randomness tests, a Hadamard transform, a measure of the Kolmogorov complexity, and/or using a different measure of the randomness of a sequence of numbers. When entropy watchdog 310 determines that the available entropy in application server 160 is below a particular entropy threshold, entropy watchdog 310 may request a particular quantity of quantum random numbers from EaaS system 130.

Certificate manager 320 may generate digital certificates, such as a public key certificate, using quantum random numbers, or quantum random numbers hashed with locally generated random numbers. The digital certificates may be used, for example, to establish a secure communication with UE device 110 and/or with another device. As another example, the digital certificates may be used to encrypt content stored by application server 160. As yet another example, certificate manager 320 may generate a session key during a TLS handshake based on random sequences generated using quantum random numbers, or quantum random numbers hashed with locally generated random numbers.

Local entropy source 330 may include a local source of random numbers. For example, local entropy source 330 may include a hardware random number generator and/or a software random number generator that uses a particular algorithm to generate pseudorandom numbers. Entropy watchdog 310 may combine locally generated random numbers with quantum random numbers received from EaaS system 130 by, for example, hashing, and may provide the combined random numbers to certificate manager 320.

SDP client 340 may request a connection to a particular SDP gateway in SDP network 110 via SDP system 140. SDP system 140 may verify whether application server 160 is authorized to connect to the particular SDP gateway and may establish a secure connection from SDP client 340 to the particular SDP gateway if application server 160 is authorized to connect to the particular SDP gateway. For example, SDP client 340 may request a secure connection to EaaS system 130 in order to request and obtain quantum random numbers from EaaS system 130 via the secure connection.

QKD interface 350 may interface with QKD link 155. Thus, QKD interface 350 may be used to send quantum random numbers received from EaaS system 130 to another application server 160 via QKD line 155 if the other application server 160 is unable or not authorized to access SDP network 110. Similarly, application server 160 may request and receive quantum random numbers from another application server 160 via QKD link 155 if application server 160 is unable or not authorized to access SDP network 110.

Although FIG. 3 shows exemplary components of application server 160, in other implementations, application server 160 may include fewer components, different components, additional components, or differently arranged components than depicted in FIG. 3. Additionally, or alternatively, one or more components of application server 160 may perform one or more tasks described as being performed by one or more other components of application server 160.

Figure 4:
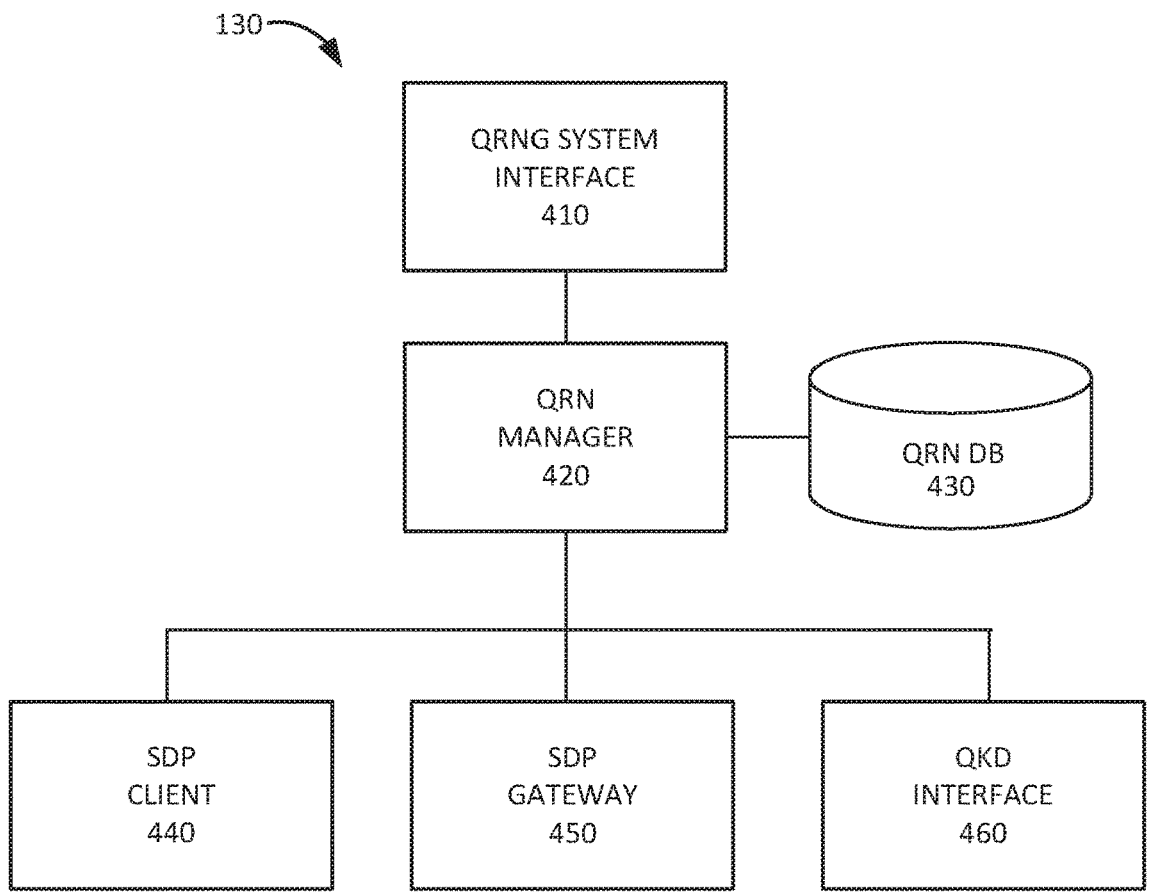
FIG. 4 is a diagram illustrating exemplary components of the Entropy-as-a-Service System of FIG. 1 according to an implementation described herein.

FIG. 4 is a diagram illustrating exemplary components of EaaS system 130. The components of EaaS system 130 may be implemented, for example, via processor 220 executing instructions from memory 230. Alternatively, some or all of the components of EaaS system 130 may be implemented via hard-wired circuitry. As shown in FIG. 4, EaaS system 130 may include a QRNG interface 410, a quantum random number (QRN) manager 420, a QRN database (DB) 430, an SDP client 440, an SDP gateway 450, and a QKD interface 460.

QRNG interface 410 may interface with QRNG system 120. For example, QRNG interface 410 may receive a real time stream of quantum random numbers from QRNG system 120. QRN manager 420 may manage the supply of quantum random numbers. For example, if the requested quantity of quantum random numbers from other devices is less than the real time supply of quantum random numbers, QRN manager 420 may store quantum random numbers received from QRNG system 120 in QRN DB 430. When the requested quantity of quantum random numbers from other devices exceeds the supply of quantum random numbers received via the real time stream from QRNG system 120, QRN manager 420 may retrieve quantum random numbers stored in QRN DB 430 and provide the retrieved quantum random numbers to a requesting device. Any quantum random number retrieved from QRN DB 430 may be erased from QRN DB 430 to ensure that each quantum random number is used only once. Thus, the quantum random numbers provided by EaaS system 130 may satisfy the requirements of a cryptographic nonce.

In some implementations, EaaS system 130 may encrypt one or more quantum random numbers into a public key and provide the public key to the requesting device. The requesting device may decrypt the public key and retrieve the one or more quantum random numbers from the public key. For example, if a public key field in a message includes 2048 bits of information and a public key takes up 1024 bits of information, the remaining 1024 bits may be used to send quantum random numbers to the requesting device.

SDP client 440 may request a connection to a particular SDP gateway in SDP network 110 via SDP system 140. SDP system 140 may verify whether EaaS system 130 is authorized to connect to the particular SDP gateway and may establish a secure connection from SDP client 440 to the particular SDP gateway if EaaS system 130 is authorized to connect to the particular SDP gateway.

SDP gateway 450 may accept a connection request from a particular SDP client if SDP system 140 authorizes the connection. For example, SDP gateway 450 may accept a connection from SDP client 340 of application server 160 and may establish a secure connection with SDP client 340. EaaS system 130 may provide the quantum random numbers to application server 160 via the secure SDP connection between SDP gateway 450 of EaaS system 130 and SDP client 340 of application server 160.

In some implementations, EaaS system 130 may also be connected to other devices via QKD link 155 and may include QKD interface 460. EaaS system 130 may provide quantum random numbers to another device via QKD link 155 using QKD interface 460.

Although FIG. 4 shows exemplary components of EaaS system 130, in other implementations, EaaS system 130 may include fewer components, different components, additional components, or differently arranged components than depicted in FIG. 4. Additionally, or alternatively, one or more components of EaaS system 130 may perform one or more tasks described as being performed by one or more other components of EaaS system 130.

Figure 5:
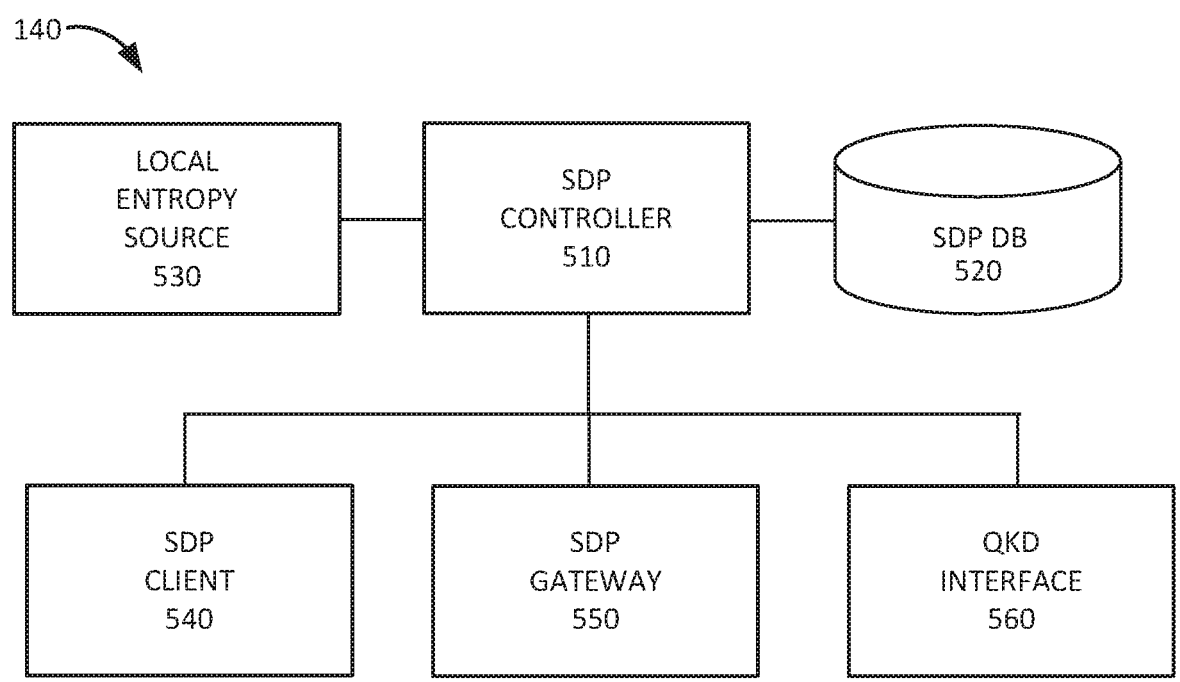
FIG. 5 is a diagram illustrating exemplary components of the Software Defined Perimeter System of FIG. 1 according to an implementation described herein.

FIG. 5 is a diagram illustrating exemplary components of SDP system 140. The components of SDP system 140 may be implemented, for example, via processor 220 executing instructions from memory 230. Alternatively, some or all of the components of SDP system 140 may be implemented via hard-wired circuitry. As shown in FIG. 5, SDP system 140 may include an SDP controller 510, an SDP DB 520, a local entropy source 530, an SDP client 540, an SDP gateway 550, and a QKD interface 560.

SDP controller 510 may control communication within SDP network 110, and between devices in SDP network 110 and devices outside SDP network 110, based on information stored in SDP DB 520. For example, for each SDP client in SDP network 110, or in data center network 150, SDP DB 520 may store one or more digital certificates, such as a TLS certificate that includes a public key, an MFA token, SAML authorizations, an application whitelist, and/or other authentication or authorization information that may be used by SDP controller 510 to determine whether to grant permission and establish a secure connection from the SDP client to a particular SDP gateway.

SDP controller 510 may use quantum random numbers, and/or quantum random numbers hashed with locally generated random numbers from local entropy source 530, to generate keys for digital certificates used to establish a secure communication in SDP network 110 between an SDP client and an SDP gateway. Furthermore, SDP controller 510 may generate a session key during a TLS handshake based on random sequences generated using quantum random numbers, or quantum random numbers hashed with locally generated random numbers. Thus, SDP controller 510 may request quantum random numbers from EaaS system 130 when SDP controller 510 is starved for entropy. For example, SDP controller 510 may include an entropy watchdog similar to entropy watchdog 310 described above with respect to application server 160.

SDP client 540 may request a connection to a particular SDP gateway in SDP network 110 via SDP controller 510 and SDP gateway 550 may accept authorized connection requests from SDP clients. In other words, since SDP system 140 is part of SDP network 110, SDP system 140 may also authorize its own connections to other devices in SDP network 110. In some implementations, SDP system 140 may also be connected to other devices via QKD link 155 and may include QKD interface 560. For example, in some implementations, SDP system 140 may receive quantum random numbers from EaaS system 130 via QKD link 155.

Although FIG. 5 shows exemplary components of SDP system 140, in other implementations, SDP system 140 may include fewer components, different components, additional components, or differently arranged components than depicted in FIG. 5. Additionally, or alternatively, one or more components of SDP system 140 may perform one or more tasks described as being performed by one or more other components of SDP system 140.

Figure 6:
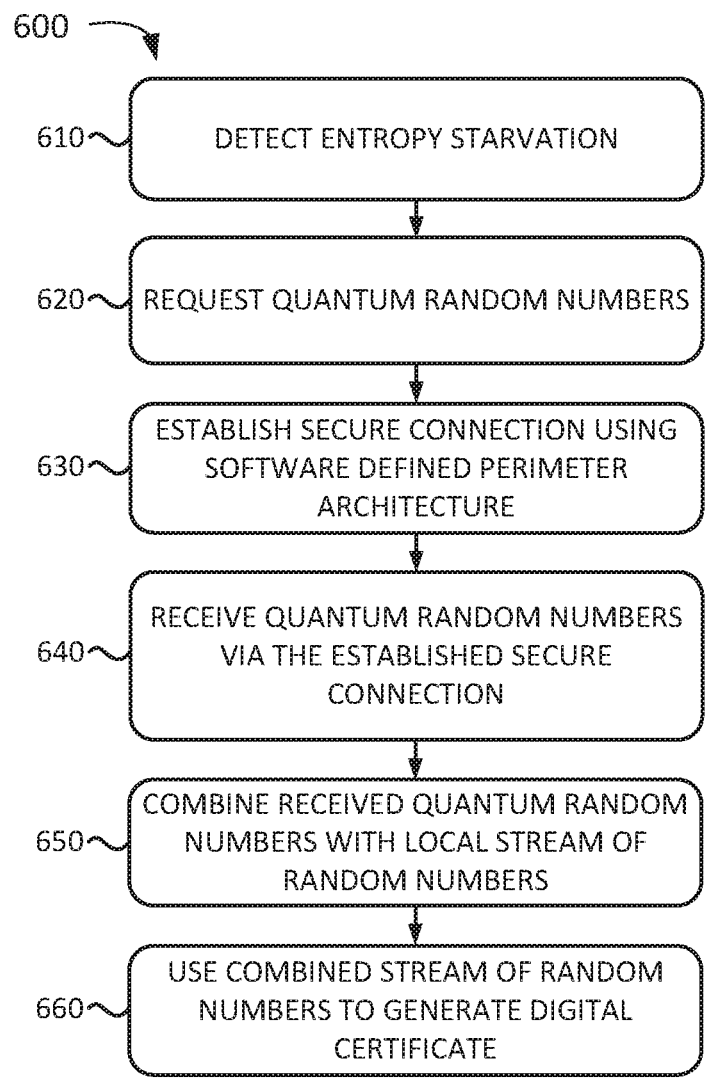
FIG. 6 is a flowchart of a process of obtaining and using quantum random numbers according to an implementation described herein.

FIG. 6 is a flowchart 600 of a process of obtaining and using quantum random numbers according to an implementation described herein. In some implementations, the process of FIG. 6 may be performed by application server 160. In other implementations, some or all of the process of FIG. 6 may be performed by another device or a group of devices separate from application server 160.

The process of FIG. 6 may include detecting entropy starvation (block 610) and requesting quantum random numbers (block 620). For example, entropy watchdog 310 may determine that the available entropy has dropped below an available entropy threshold for application server 160 and may send a request to EaaS system 130 for a particular quantity of quantum random numbers.

A secure connection may be established using SDP architecture (block 630) and quantum random numbers may be received via the established secure connection (block 640). For example, SDP client 340 may intercept the request to EaaS system 130 and may send a request to SDP system 140 to establish a secure connection to SDP gateway 450 of EaaS system 130. SDP system 140 may authorize the connection and provide a certificate with a public key for SDP gateway 450 to SDP client 340 for establishing a TLS connection, or another type of secure connection, to SDP gateway 450 of EaaS system 130. Entropy watchdog 310 may then receive the requested quantity of quantum random numbers from EaaS system 130 via SDP client 340 using the established secure connection.

The received quantum random numbers may be combined with a local stream of random numbers (block 650) and the combined stream of random numbers may be used to generate a digital certificate (block 660). For example, entropy watchdog 310 may hash the received quantum random numbers with a local source of random numbers to generate a stream of random numbers. In other implementations, the received quantum random numbers may be used directly without combining the quantum random numbers with the local source of random numbers. Certificate manager 320 may use the stream of random numbers to generate a public key for a certificate and use the certificate to establish a secure communication connection with another device, such as UE device 110. Additionally, or alternatively, the stream of random numbers may be used for a different purpose, such as generating a symmetric key used to encrypt or decrypt data send to another device or stored by application server 160. For example, certificate manager 320 may generate a session key during a TLS handshake based on random sequences generated using quantum random numbers, or quantum random numbers hashed with locally generated random numbers.

Figure 7:
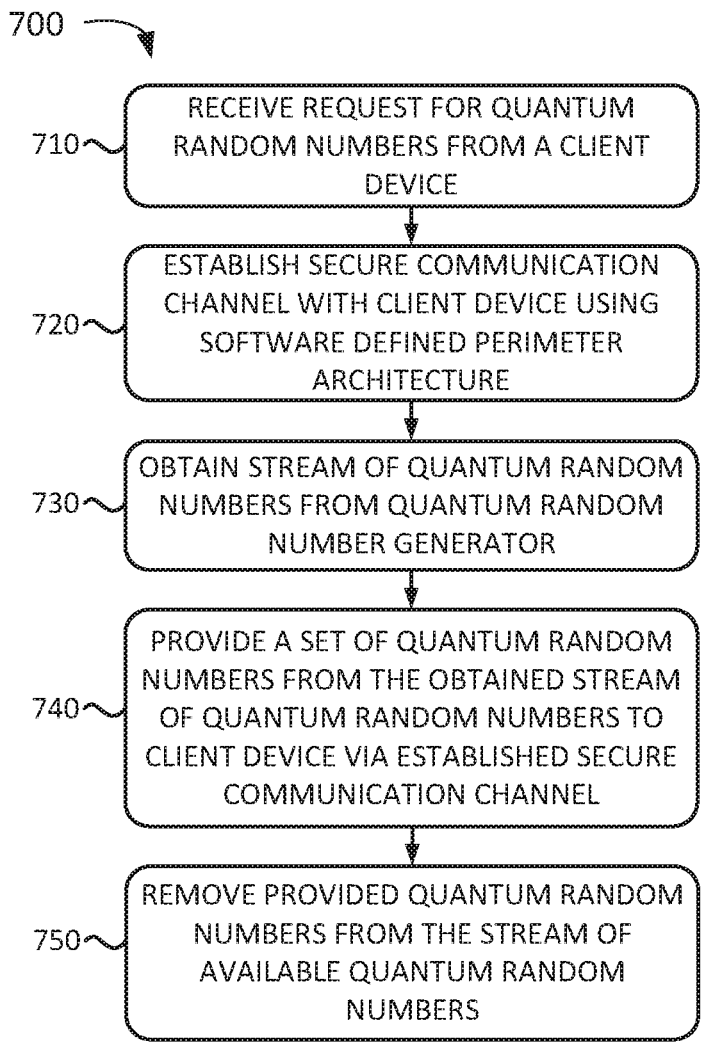
FIG. 7 is a flowchart of a process of providing quantum random numbers according to an implementation described herein.

FIG. 7 is a flowchart 700 of a process of providing quantum random numbers according to an implementation described herein. In some implementations, the process of FIG. 7 may be performed by EaaS system 130. In other implementations, some or all of the process of FIG. 7 may be performed by another device or a group of devices separate from EaaS system 130.

The process of FIG. 7 may include receiving a request for quantum random numbers from a client device (block 710). As an example, EaaS system 130 may receive a request for a particular quantity of quantum random numbers from application server 160. As another example, EaaS system 130 may receive a request for a particular quantity of quantum random numbers from SDP system 140. The request may be received via a secure communication connection authorized by SDP system 140.

A secure communication channel may be established with the client device using SDP architecture (block 720). As an example, EaaS system 130 may use an established communication channel via which the request for quantum random numbers was received. As another example, EaaS system 130 may establish a new communication session to the client device by requesting an authorization for the connection to the client device from SDP system 140.

A stream of quantum random numbers may be obtained from a quantum random number generator (block 730) and provided to the client device via the established secure communication channel (block 740). As an example, EaaS system 130 may retrieve stored quantum random numbers from QRN DB 430 and may send the retrieved quantum random numbers to the requesting client device via the established secure SDP connection. As another example, EaaS system 130 may receive quantum random numbers from a live stream of quantum random numbers from QRNG system 120 and may provide the quantum random numbers from the live stream to the requesting client device via the established secure SDP connection.

The request received from the client device may specify a particular quantity of quantum random numbers that is needed by the client device and EaaS system 130 may provide the requested quantity of quantum random numbers. As an example, the request may specify a particular number of bytes of quantum random numbers. As another example, the request may specify a particular bit rate of quantum random number for a particular period of time.

The provided quantum random numbers may be removed from the stream of available quantum random numbers (block 750). For example, if the quantum random numbers were retrieved from QRN DB 430, the quantum random numbers may be erased from QRN DB 430 to ensure each quantum random number is only used once. If the quantum random numbers were retrieved from a live stream received from QRNG system 120, EaaS system 130 may ensure that the quantum random numbers are not stored in QRN DB 430 so that each quantum random number is only used once.

Figure 8:
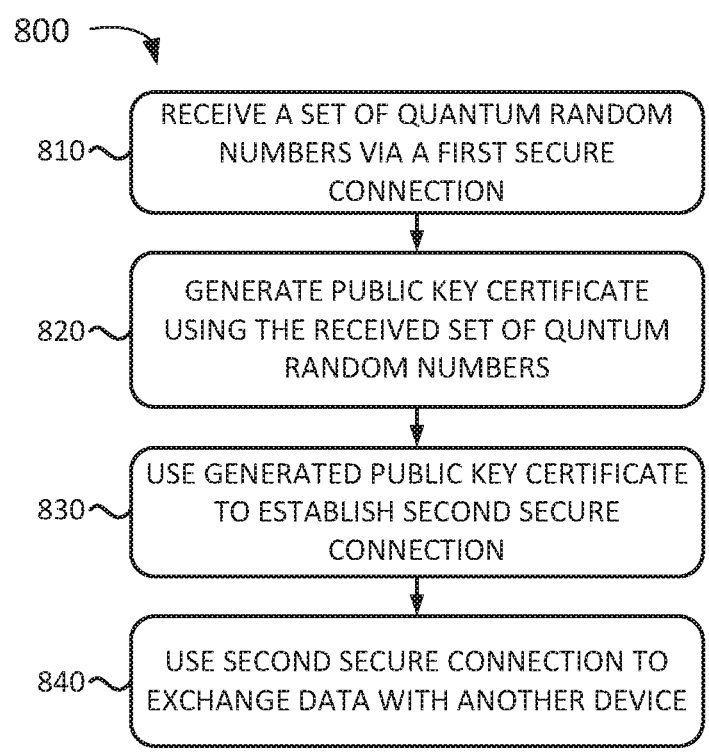
FIG. 8 is a flowchart of a process of generating a certificate using quantum random numbers according to an implementation described herein.

FIG. 8 is a flowchart 800 of a process of generating a certificate using quantum random numbers according to an implementation described herein. In some implementations, the process of FIG. 8 may be performed by SDP system 140. In other implementations, some or all of the process of FIG. 8 may be performed by another device or a group of devices separate from SDP system 140.

The process of FIG. 8 may include receiving a set of quantum random numbers via a first secure connection (block 810). For example, SDP system 140 may establish a secure SDP connection with EaaS system 130 and may receive a set of quantum random numbers from EaaS system 130 using the established secure SDP connection. A public key certificate may be generated using the received quantum random numbers (block 820), used to generate a second secure connection (block 830) and the second secure connection may be used to exchange data with another device (block 840). For example, SDP system 140 may use the received quantum random numbers to generate a public key for a public key certificate and may use the public key certificate to establish a connection from application server 160 to EaaS system 130. Application server 160 may then use the established second secure connection to receive quantum random numbers from EaaS system 130. As another example, SDP system 140 may generate a session key during a TLS handshake based on random sequences generated using quantum random numbers, or quantum random numbers hashed with locally generated random numbers.

Figure 9:
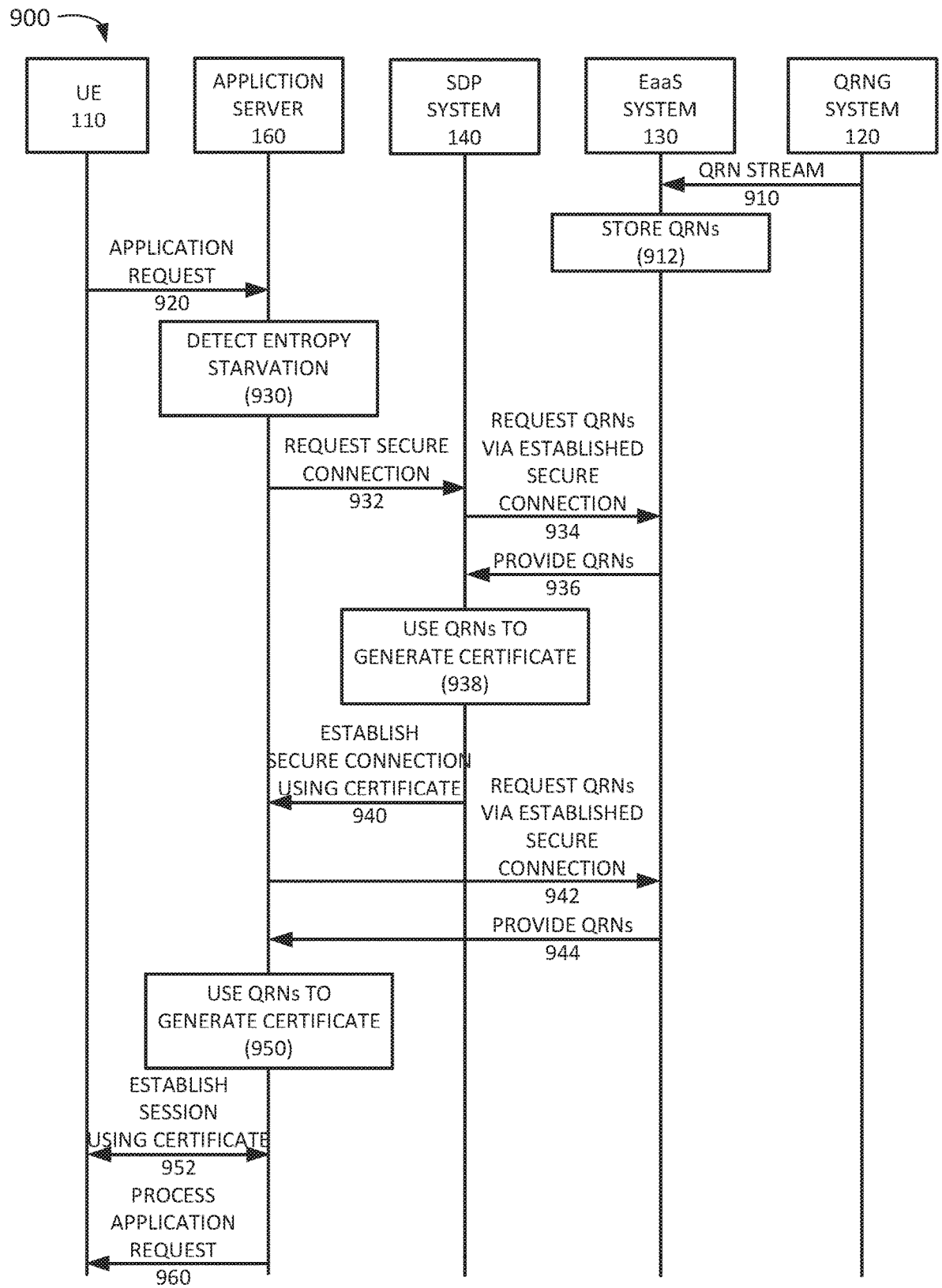
FIG. 9 is a diagram of an exemplary signal flow according to an implementation described herein.

FIG. 9 is a diagram of an exemplary signal flow 900 according to an implementation described herein. Signal flow 900 may include EaaS system 130 receiving a stream of quantum random numbers from QRNG system 120 (signal flow 910) and storing the received quantum random numbers in QRN DB 430 (block 912).

At a later time, UE device 110 may send an application request to application server 160 for an application service (signal 920). For example, UE device 110 may request a web page hosted by application server 160 and application server 160 may select to generate an application session via the requested web page. Application server 160 may select to generate a public key certificate for the application session and entropy watchdog 310 may detect entropy starvation (block 930).

In response, application server 160 may request quantum random numbers from EaaS system 130. In order to communicate with EaaS system 130, application server 160 may request a secure SDP connection with EaaS system 130 via SDP system 140 (block 932). SDP system 140 may also detect insufficient entropy and may, therefore, request quantum random numbers from EaaS system 130 via an established secure SDP connection (signal 934). EaaS system 130 may provide the requested quantum random numbers to SDP system 140 (signal 936) and SDP system 140 may use the received quantum random numbers to generate a public key certificate for the connection from application server 160 to EaaS system 130 (block 938).

SDP system 140 may authorize the connection (signal 940) and application server 160 may establish the connection using the public key certificate and request a quantity of quantum random numbers from EaaS system 130 (signal 942). In response, EaaS system 130 may provide the requested quantity of quantum random numbers to application server 160 (signal 944). Application server 160 may use the received quantum random numbers to generate a public key certificate for the session between application server 160 to UE device 110 (block 950). Application server 160 may then establish the session with UE device 110 using the certificate (signal 952) and may process the application request by exchanging data with UE device 110 using the established session (signal 960).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, and a series of signals with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a computer device, a request for quantum random numbers from a client device;
determining, by the computer device, a quantity of quantum random numbers requested by the client device;
establishing, by the computer device, a secure communication channel with the client device;
obtaining, by the computer device, a stream of quantum random numbers from a quantum random number generator;
providing, by the computer device, the determined quantity of quantum random numbers from the obtained stream of quantum random numbers to the client device via the established secure communication channel; and
removing, by the computer device, the determined quantity of quantum random numbers from the stream of quantum random numbers, after providing the determined quantity of quantum random numbers to the client device via the established secure communication channel.

2. The method of claim 1, wherein the secure communication channel includes a Software Defined Perimeter (SDP) channel.

3. The method of claim 1, wherein the stream of quantum random numbers includes a real time stream of quantum random numbers.

4. The method of claim 1, wherein the stream of quantum random numbers includes quantum random numbers retrieved from a data store.

5. The method of claim 1, further comprising: generating a public key certificate using quantum numbers from the stream of quantum random numbers.

6. The method of claim 5, further comprising:
generating a secure communication tunnel to another device using the generated public key certificate.

7. The method of claim 1, further comprising:
encrypting one or more quantum random numbers, from the stream of quantum random numbers, into a public key; and
providing the public key to the client device.

8. The method of claim 1, further comprising:
providing a set of quantum random numbers, from the stream of quantum random numbers, to another device via a quantum key distribution (QKD) link.

9. The method of claim 1, further comprising:
hashing a set of quantum random numbers, from the stream of quantum random numbers, with random numbers from a local source to generate a random number stream.

10. A computer device comprising:
a memory storing instructions; and
a processor configured to execute the instructions to:
receive a request for quantum random numbers from a client device;
determine a quantity of quantum random numbers requested by the client device;
establish a secure communication channel with the client device;
obtain a stream of quantum random numbers from a quantum random number generator;
provide the determined quantity of quantum random numbers from the obtained stream of quantum random numbers to the client device via the established secure communication channel; and
remove the determined quantity of quantum random numbers from the stream of quantum random numbers, after providing the determined quantity of quantum random numbers to the client device via the established secure communication channel.

11. The computer device of claim 10, wherein the secure communication channel includes a Software Defined Perimeter (SDP) channel.

12. The computer device of claim 10, wherein the processor is further configured to: generate a public key certificate using quantum numbers from the stream of quantum random numbers.

13. The computer device of claim 12, wherein the processor is further configured to:
generate a secure communication tunnel to another device using the generated public key certificate.

14. The computer device of claim 10, wherein the processor is further configured to:
provide a set of quantum random numbers, from the stream of quantum random numbers, to another device via a quantum key distribution (QKD) link.

15. The computer device of claim 10, wherein the processor is further configured to:

hash a set of quantum random numbers, from the stream of quantum random numbers, with random numbers from a local source to generate a random number stream.

16. A system comprising:
a first computer device; and
a second computer device; wherein
the first computer device is configured to:
establish a secure communication channel with the second computer device;
obtain a stream of quantum random numbers from a quantum random number generator;
provide a particular quantity of quantum random numbers from the obtained stream of quantum random numbers to the second computer device via the established secure communication channel; and
remove the provided particular quantity of quantum random numbers from the stream of quantum random numbers, after providing the particular quantity of quantum random numbers to the second computer device via the established secure communication channel; and wherein the second computer device is configured to:
generate a public key certificate using quantum numbers from the provided particular quantity of quantum random numbers; and
generate a secure communication tunnel to another device using the generated public key certificate.

17. The system of claim 16, wherein the secure communication channel includes a Software Defined Perimeter (SDP) channel.

18. The system of claim 16, wherein the first computer device is configured to provide the particular quantity of quantum random numbers, from the stream of quantum random numbers, to another device via a quantum key distribution (QKD) link.

19. The system of claim 16, wherein the first computer device is further configured to:
hash the particular quantity of quantum random numbers, from the stream of quantum random numbers, with random numbers from a local source to generate a random number stream.

20. The system of claim 16, wherein the first computer device is further configured to: encrypt one or more quantum random numbers, from the stream of quantum random numbers, into a public key; and
provide the public key to another device.

* * * * *